Nov. 1, 1932.    W. L. BEALL    1,886,149
GRAIN PLANTER
Filed Aug. 14, 1929    2 Sheets-Sheet 1
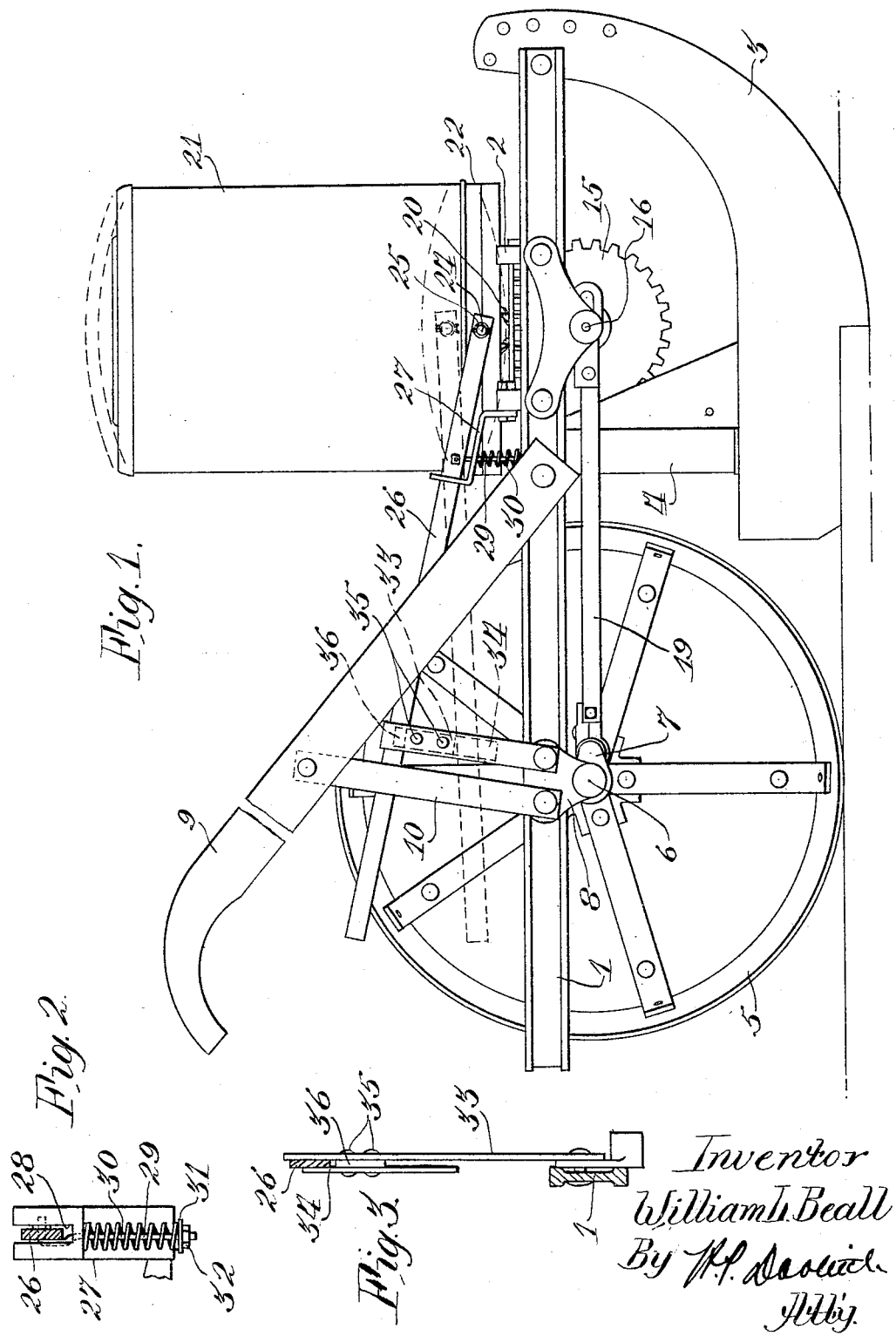
Inventor
William L. Beall
By W. P. Dawich
Atty.

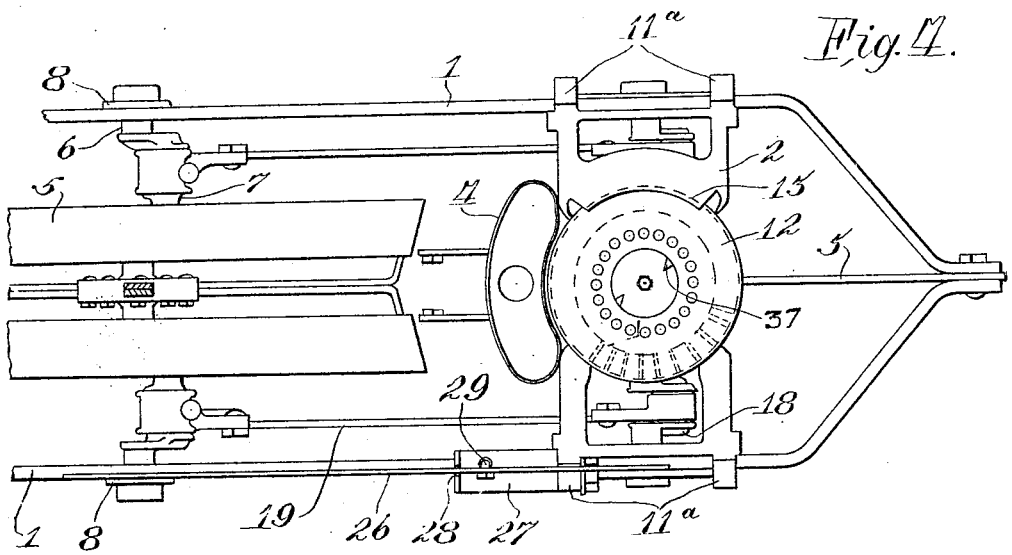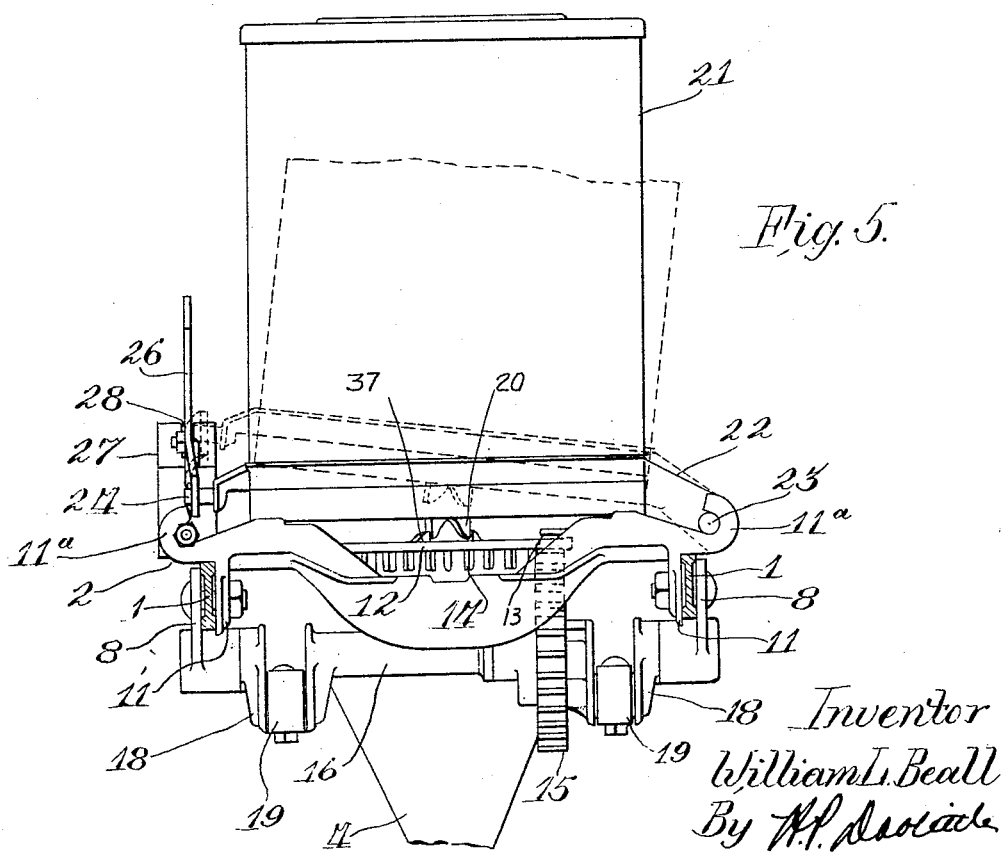

Patented Nov. 1, 1932

1,886,149

UNITED STATES PATENT OFFICE

WILLIAM L. BEALL, OF CHATTANOOGA, TENNESSEE, ASSIGNOR TO INTERNATIONAL HARVESTER COMPANY, A CORPORATION OF NEW JERSEY

GRAIN PLANTER

Application filed August 14, 1929. Serial No. 385,713.

This invention relates to walking planters. More particularly it relates to improvements in a grain planting device such as is used in certain types of cotton and corn planters.

The principal object of the invention is to provide a dispensing device of the type referred to in which the seed hopper is automatically engaged with the driving mechanism during forward operation, and automatically disengaged during rearward movement.

Another object is to provide means for mounting and for manually controlling the dispensing mechanism by tilting the seed hopper.

Other objects will be apparent from the detailed description to follow.

In the drawings:—

Figure 1 is a grain planter showing a hopper construction embodying the invention;

Figure 2 is an enlarged detail of the tilting lever supporting bracket and the tensioning member which is attached thereto;

Figure 3 is an enlarged detail of the means for holding the tilting lever in position;

Figure 4 is a top plan view of the planter with the seed can removed, showing the peculiar arrangement of the driving plate as it is mounted on the hopper base; and, Figure 5 is a front elevation showing the manner in which the hopper is mounted on the supporting base, the dotted lines showing the hopper in tilted position.

As shown in Figure 4, the main frame consists of two side members 1 and a cross member 2, which serves as a hopper supporting base. A furrow opener 3 is clamped between the front ends of the side members 1, which are bent together at the front and secured by suitable means. The rear end of the furrow opener has a seed passage 4 extending up to the hopper base, as shown in Figure 4.

A driving wheel 5 is mounted on an axle shaft 6, which has cranks 7 on either side of the wheel for driving the planter mechanism. The axle shaft is rotatably mounted in bearing blocks 8 secured to the side frame members 1. Handles 9 are secured to the side frame members 1 intermediate their length and are held in position by bracing bars 10.

The cross frame member or hopper support 2 is of a peculiar construction. Downwardly projecting, apertured ears 11, as shown in Figure 5, are secured to the frame side members by suitable bolts. The member 2 has two spaced hook-shaped extensions 11$^a$ extending laterally over each of the side frame members 1. The center of the cross member 2 is dipped downwardly and a driving member or gear 12 is rotatably mounted thereon. The hopper base 2 has a flange 13 extending over the driving member 12 to hold it securely in position against tipping during rotative movement. The under side of the member 12 is provided with gear teeth 14 which mesh with the gear 15 mounted on a crank shaft 16 below the frame. In Figure 4 a plurality of the gear teeth 14 are indicated in dotted lines and in Figure 5 the upper part of the gear 15 is indicated by dotted lines to show its engagement with the teeth 14.

The crank shaft 16 is provided with two spaced cranks 18 which are joined by connecting rods 19 to the cranks 7 on the rear driving shaft 6. The crank shaft 16 is rotatably secured in position by two bearing blocks 8 secured to the frame side members by the same means which hold the hopper supporting base in position. Ratchet teeth 20 are provided on the upper surface of the driving member 12. These teeth are provided with a vertical engaging surface adapted to transmit driving torque when the planter is moved forwardly, and slanting surfaces adapted to serve as sliding cams when the planter is moved in a rearward direction.

The hopper consists of a covered seed container 21 and a base member 22. The base has extensions on one side through which a hinging rod 23 extends. The rod 23 is adapted to slide under the hook-shaped extensions 11$^a$ on one side of the hopper support, to form a hinge for the hopper. The other side of the hopper base is provided with an extending pin 24, which extends through an opening 25 in the end of a tilting lever 26.

The tilting lever 26 extends rearwardly and is supported intermediate its length by a bracket 27. The bracket 27 is secured by a bolt to one of the hook-shaped extensions 11ª on the hopper base. As shown in Figure 1, the bracket 27 has an intermediate portion which is substantially parallel to the tilting lever. A slot 28 in the bracket 27 serves as a pivot point for the tilting lever during manual operation and prevents lateral displacement of said lever. A small rod 29 is secured to the tilting lever and extends through an opening in the flattened portion of the bracket 27. A spring 30 abuts against the bottom of the flattened portion of the bracket 27 and against a washer 31 held on the rod by an adjustable nut 32.

At the rear of the planter frame near the handle brace 10 an upwardly extending bar 33 is attached to the side frame member and is provided with means for holding the tilting lever in lowered or lifted positions. Figure 3 shows an enlarged detail of this means. A short bar 34 is secured to the bar 33 in spaced relation by securing means 35 and a spacer 36.

The dispensing means in the hopper, not shown, is driven by ratchet teeth 37 similar to the teeth 20, integrally mounted on an actuating member, shown in Figure 5, which extend downwardly into engagement with the teeth 20 on the member 12.

In the operation of the planter the wheel 5 drives the gear 15 by means of the cranks on the respective shafts and the connecting rod. The gear 15 drives the member 12. During forward motion, the ratchet teeth 20 engage the ratchet teeth 37 and drive the distributing mechanism in the hopper. When the hopper is tilted and placed in operative position, it is very likely that the ratchet teeth 37 may rest on the top of the ratchet teeth 20. However, the tilting lever 26 is raised and hooked over the top of the rearwardly positioned support 34. In this position the hopper is slightly tilted, as shown in an exaggerated position in Figures 1 and 5. The tilting lever 26 is spaced somewhat above the supporting bracket 24, and the spring 29 exerts a downward force which tends to seat the hopper base upon its support. As soon as the planter is given a forward movement, the ratchet teeth 36 drop down into engagement with the ratchet teeth 20.

The construction of this planter also permits of backward movement of the planter. The sliding cam surfaces on the ratchet teeth 20 raise the hopper against the spring pressure and jump the teeth 36.

When it is desired to raise the hopper so that the planting mechanism will be completely out of engagement with the driving mechanism, the tilting lever is moved from its position at the top of the holding bar 34 and is pushed downwardly. When the tilting lever is manually operated to lift the hopper, it is pivoted about the bottom of the slot 28 in the bracket 27. As the spring 30 is attached to the tilting bar close to the point of pivoting of the bracket 27, comparatively little resistance is offered to the manual tilting movement. If it is desired to hold the hopper out of operative position, that is, with the ratchet teeth 36 above and out of engagement with the teeth 20, the tilting lever may be hooked under the lower extension of the bar 34.

Although the dispensing device of this invention has been described as applied to a seed planter of a well known construction, it is to be understood that it may be used wherever such a construction is adaptable. Applicant limits his invention only by the scope of the appended claims.

What is claimed is:

1. In a grain planter, a frame, a hopper support on said frame, a seed hopper hinged to said support at one side of the frame, dispensing mechanism carried by said hopper and having an actuating member extending below the hopper, driving means carried by the frame positioned to engage said actuating member, said means being disengageable by movement of the planter in a reverse direction, a bracket mounted on the frame on the side of the hopper opposite the hinge, a slot in said bracket open at the top, a tilting lever extending through said slot and being pivotally connected to the hopper, a resilient tensioning means attached to the tilting lever, said tilting lever having an extension beyond the bracket, and means for holding said extension in a pivoted position whereby the hopper may tilt with the lever pivoting about said means, said means permitting the removal of said lever from the holding means for manually tilting the hopper.

2. In a planter, a frame having a supporting wheel, a hopper support on said frame, a seed hopper hinged to said support, dispensing mechanism carried by said hopper and having an actuating member extending below the hopper, said member being provided with downwardly extending ratchet teeth, a horizontally positioned driving gear mounted on the hopper support, upstanding ratchet teeth on said gear positioned and formed to engage the teeth on the actuating member when the gear is rotated in one direction and to ratchet over said teeth and tilt the hopper when the gear is rotated in the other direction, means for driving said gear from the supporting wheel, and means to resiliently hold the hopper in position.

In testimony whereof I affix my signature.
WILLIAM L. BEALL.